United States Patent
Caceres et al.

(10) Patent No.: US 11,166,211 B2
(45) Date of Patent: Nov. 2, 2021

(54) SYSTEM AND METHOD OF HANDOVER MANAGEMENT FOR PREDETERMINED MOBILITY

(71) Applicant: Verizon Patent and Licensing Inc., Arlington, VA (US)

(72) Inventors: Manuel Enrique Caceres, Basking Ridge, NJ (US); Taussif Khan, Martinsville, NJ (US); Warren Hojilla Uy, Randolph, NJ (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 309 days.

(21) Appl. No.: 16/506,278

(22) Filed: Jul. 9, 2019

(65) Prior Publication Data
US 2021/0014755 A1 Jan. 14, 2021

(51) Int. Cl.
*H04W 36/06* (2009.01)
*H04W 4/029* (2018.01)
*H04W 36/00* (2009.01)
*H04W 8/08* (2009.01)

(52) U.S. Cl.
CPC ........... *H04W 36/06* (2013.01); *H04W 4/029* (2018.02); *H04W 8/08* (2013.01); *H04W 36/0038* (2013.01)

(58) Field of Classification Search
CPC . H04W 36/06; H04W 4/029; H04W 36/0038; H04W 8/08; H04W 36/32; H04W 76/10; H04W 16/28; H04W 40/12; H04W 40/20; H04W 40/205
See application file for complete search history.

(56) References Cited

U.S. PATENT DOCUMENTS

| | | | |
|---|---|---|---|
| 10,517,124 B2* | 12/2019 | Balappanavar | H04W 40/205 |
| 10,939,328 B2* | 3/2021 | Kersch | H04W 36/0009 |
| 2017/0195893 A1* | 7/2017 | Lee | H04L 5/006 |
| 2019/0044609 A1* | 2/2019 | Winkle | B64C 39/024 |
| 2019/0318635 A1* | 10/2019 | Yeh | G08G 5/0069 |

* cited by examiner

*Primary Examiner* — Mounir Moutaouakil (57) ABSTRACT

Systems, methods, and computer-readable media described herein provide for obtaining, mobility information associated with an end device, wherein the mobility information includes a starting location and a destination location; identifying multiple mobility routes from the starting location to the destination location; identifying a set of wireless resources accessible along each of the mobility routes; selecting, from the multiple mobility routes, a predetermined mobility route based on the sets of wireless resources; selecting, from the sets of wireless resources, wireless resources handover targets in the predetermined mobility route; generating mobility control information including the set of wireless station handover targets; and transmitting a mobility control message including the mobility control information to the end device and at least one of wireless resources handover targets.

20 Claims, 6 Drawing Sheets

SYSTEM AND METHOD OF HANDOVER MANAGEMENT FOR PREDETERMINED MOBILITY

BACKGROUND

In a wireless network, the performance of handover procedures between wireless stations, as well as the performance of inter-MEC (multi-access edge computing or mobile edge computing) handovers, impact the service continuity provided for an end device's mobility usage in the wireless network. To facilitate lossless handover, conventional techniques often involve the reservation and/or allocation of specific radio resources (e.g., computer processing units (CPUs), graphic processing units (GPUs), bandwidth, etc.)—in each neighboring cell of a cell in which an end device has an active connection—ahead of any actual need to execute a handover based on mobility of the end device. Invariably, this practice results in the provisioning of limited network resources in cells that the end device does not ultimately enter/access.

DETAILED DESCRIPTION OF THE PREFERRED EMBODIMENTS

The following detailed description refers to the accompanying drawings. The same reference numbers in different drawings may identify the same or similar elements. Also, the following detailed description does not limit the invention.

Development and design of radio access networks (RANs) present certain challenges from a network-side perspective and an end device perspective. To enhance performance, MEC is being implemented in which core network capabilities (e.g., computational, storage, etc.) are situated at the network edge to improve latency and reduce traffic being sent to the core network. The ability of a system to properly handle lossless inter-MEC mobility is needed to enable such applications/services that support devices that require service continuity across MEC boundaries, such as cellular vehicle-to-everything (C-V2X) and autonomous vehicles.

One enhancement made possible through these networks is the use of MEC (or edge) servers. Edge servers allow high network computing loads to be transferred onto the edge servers. Depending on the location of the edge servers relative to the point of attachment (e.g., a wireless station for an end device), MEC servers may provide various services and applications to end devices with minimal latency. Generally, lower latencies are achieved when MEC servers are positioned with shorter distances to a network edge.

For mobility usage, end devices (or user equipment (UE)) can move about MEC sites. This requires special consideration from the network in order to maintain low latency interactions. For end devices moving within relatively small cells associated with a single MEC site, such change of association between small cells does not impact the context of an application executing specific to the end device. For end devices moving between small cells to different MEC sites, the context of the application per end device needs to be transferred from a source MEC site to a destination MEC so as to maintain the low latency communication between the end device and the MEC site servicing the application.

If end device density increases for a MEC site and exceeds a configured threshold for the total resource capacity of the MEC site servicing the end devices, then end devices with lower priority (e.g., from an application latency aspect) should be offloaded to a neighboring MEC site. Example of such resources may be a CPU, a GPU, memory, bandwidth, etc. In current cellular networks, such as Long-Term Evolution (LTE) networks, the intelligence and wireless service are in the core network. Depending on the needs of the application, the centralized model may be disadvantageous. For example, for applications that have extremely low latency requirements, the centralized model may be unable to satisfy such requirements. When multiple MEC sites are near the network edge, frequent switching may cause jitter when MEC sites are switched. Conversely, when MEC sites are co-located with the core to minimize switching between MEC sites, the resulting latency may not meet application requirements.

According to systems and methods described herein, a wireless resources handover service is provided. An end device may synchronize with a wireless network so the wireless network knows the mobility profile of the end device, and the wireless network can predetermine and/or prepare the appropriate wireless resources. The end device can signal its mobility state to the wireless network, and the wireless network can determine when and where the end device will roam in relation to the edge resources to maintain service continuity.

Figure 1:
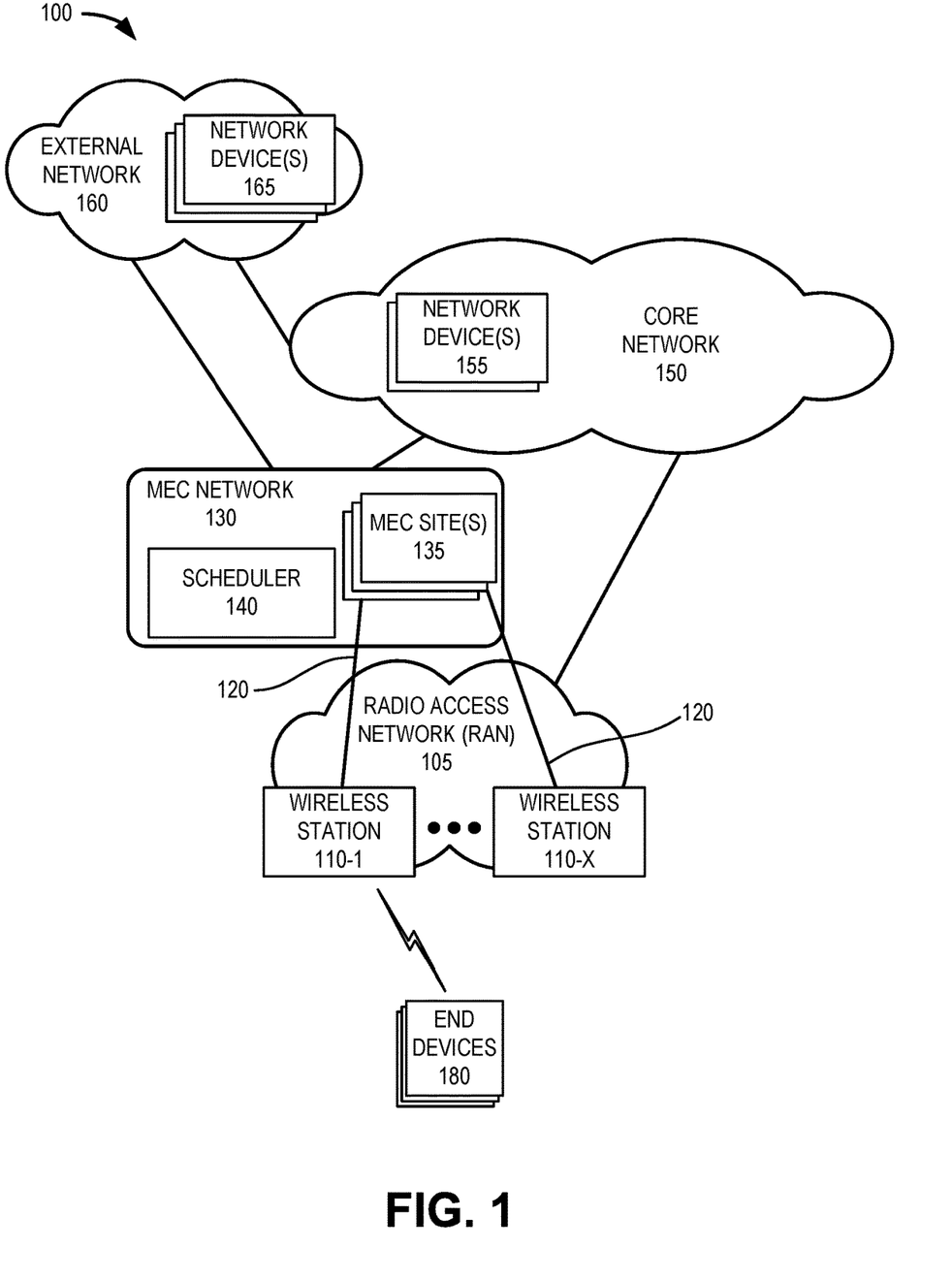
FIG. 1 is a diagram illustrating an exemplary environment for which an exemplary embodiment of a wireless resources handover service may be implemented.

FIG. 1 is a diagram illustrating an exemplary environment 100 in which an embodiment of the wireless resources handover service may be implemented. As illustrated, environment 100 includes a RAN 105, a MEC network 130, a core network 150, and an external network 160. Access network 105 may include wireless stations 110-1 through 110-X (referred to collectively as wireless stations 110 and individually (or generally) as wireless station 110). MEC network 130 may include MEC sites 135 and scheduler 140; core network 150 may include network devices 155; and external network 160 may include network devices 165. Environment 100 further includes one or more end devices 180.

The number, the type, and the arrangement of network devices 155/165, and the number of end devices 180 are exemplary. A component, an element, and/or a function (each referred to herein simply as a device) may be implemented according to one or multiple network architectures, such as a client device, a server device, a peer device, a proxy device, a cloud device, a virtualized function, and/or another type of network architecture (e.g., software defined networking (SDN), virtual, logical, network slicing, etc.). Additionally, a device may be implemented according to various computing architectures, such as centralized, distributed, cloud (e.g., elastic, public, private, etc.), edge, fog, and/or another type of computing architecture.

Environment 100 includes various communication links between the networks, between network devices 155/165, and between end devices 180 and network devices 155/165. Environment 100 may be implemented to include wired, optical, and/or wireless communication links among network devices 155/165 and the networks illustrated. A connection via a communication link may be direct and/or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, RAN 105 may include a Fourth Generation (4G) RAN, a 4.5G RAN, a Fifth Generation (5G) RAN, and/or another type of RAN. By way of further example, RAN 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. Access network 105 may further include other types of wireless networks, such as a WiFi network, a Worldwide Interoperability for Microwave Access (WiMAX) network, a local area network (LAN), a Bluetooth network, a personal area network (PAN), or another type of network.

According to various exemplary embodiments, RAN 105 may be implemented according to various architectures of wireless service, such as, for example, macrocell, microcell, femtocell, or other configuration. Additionally, according to various exemplary embodiments, RAN 105 may be implemented according to various wireless technologies (e.g., radio access technology (RAT), etc.), wireless standards, wireless frequencies/bands, and so forth.

Depending on the implementation, RAN 105 may include one or multiple types of wireless stations 110. For example, wireless station 110 may be implemented as a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node (e.g., a WiFi device, a WiMax device, a hot spot device, etc.) that provides a wireless access service. Wireless stations 110 may connect to MEC network 130 via backhaul links 120.

MEC network 130 includes a platform that provides applications and services at the edge of a network, such as RAN 105. MEC network 130 may be implemented using one or multiple technologies including, for example, network function virtualization (NFV), SDN, cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). For purposes of illustration, MEC sites 135 include the various types of network devices that may be resident in MEC network 130, as described herein. MEC 135 may provide various applications or services pertaining to broadband access higher user mobility (e.g., driving, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, cellular vehicle to everything (C-V2X), collaborative robots, health-related services (e.g., monitoring, remote surgery, etc.), drone delivery, public safety, etc.), and/or broadcast-like services.

Scheduler 140 may include logic that provides the wireless resources handover service described herein. Scheduler 140 may receive navigation information including at least a destination of end device 180 and map one or more predetermined routes including cells (e.g., coverage areas of wireless stations) that are accessible to end device 180 along the predetermined routes. As described further herein, scheduler 140 may forward navigation and/or handover information for end device 180 among MEC sites 135 to enable resource allocation in advance of end device 180 entering a cell. According to an exemplary embodiment, scheduler 140 may be included as logic within one or more of MEC sites 135. According to another implementation, scheduler 140 may be a centralized global scheduling and/or optimizing system.

Core network 150 may include one or multiple networks of one or multiple network types and technologies to support RAN 105. For example, core network 150 may be implemented to include an Evolved Packet Core (EPC) of an LTE, an LTE-A network, an LTE-A Pro network, a next generation core (NGC) network, and/or a legacy core network. Depending on the implementation, core network 150 may include various network devices, such as for example, a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core network 150 may include additional, different, and/or fewer network devices than those described. For purposes of illustration and description, network devices 155 may include various types of devices that may be resident in core network 150, as described herein.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts an end device application or service. For example, the end device application/service network may provide various applications or services pertaining to broadband access in dense areas (e.g., pervasive video, smart office, operator cloud services, video/photo sharing, etc.), broadband access everywhere (e.g., 50/100 Mbps, ultra low-cost network, etc.), etc.

Depending on the implementation, external network 160 may include various network devices (illustrated as network devices 165) that provide various applications, services, or other type of end device assets, such as servers (e.g., web, application, cloud, etc.), mass storage devices, data center devices, and/or other types of network devices pertaining to various network-related functions. According to an exemplary embodiment, one or multiple network devices 165 may be included within MEC sites 135 to support the station-station/inter MEC handover service, as described herein.

End device 180 includes a device that has computational and wireless communication capabilities. End device 180 may be implemented as a mobile device, a portable device, a stationary device, a device operated by a user, and/or a device not operated by a user. For example, end device 180 may be implemented as a Mobile Broadband device, a smartphone, a computer, a tablet, a netbook, a wearable device, a vehicle support system (e.g., a modem), a game system, a drone, or some other type of wireless device. According to various exemplary embodiments, end device 180 may be configured to execute various types of software (e.g., applications, programs, etc.). The number and the types of software may vary among end devices 180. End device 180 may support one or multiple RATs (e.g., 4G, 5G, etc.), one or multiple frequency bands, network slicing, dual-connectivity, and so forth.

End device 180 may include one or multiple communication interfaces that provide one or multiple (e.g., simultaneous or non-simultaneous) connections via the same or different RATs, frequency bands, etc. According to an implementation, end device 180 may be configured to support communications for the wireless resources handover service. For example, end device 180 may be configured to request the wireless resources handover service upon establishing an initial connection with MEC network 130 and provide navigation information (e.g., a destination), corresponding to the request, to MEC site 135.

Figure 2:
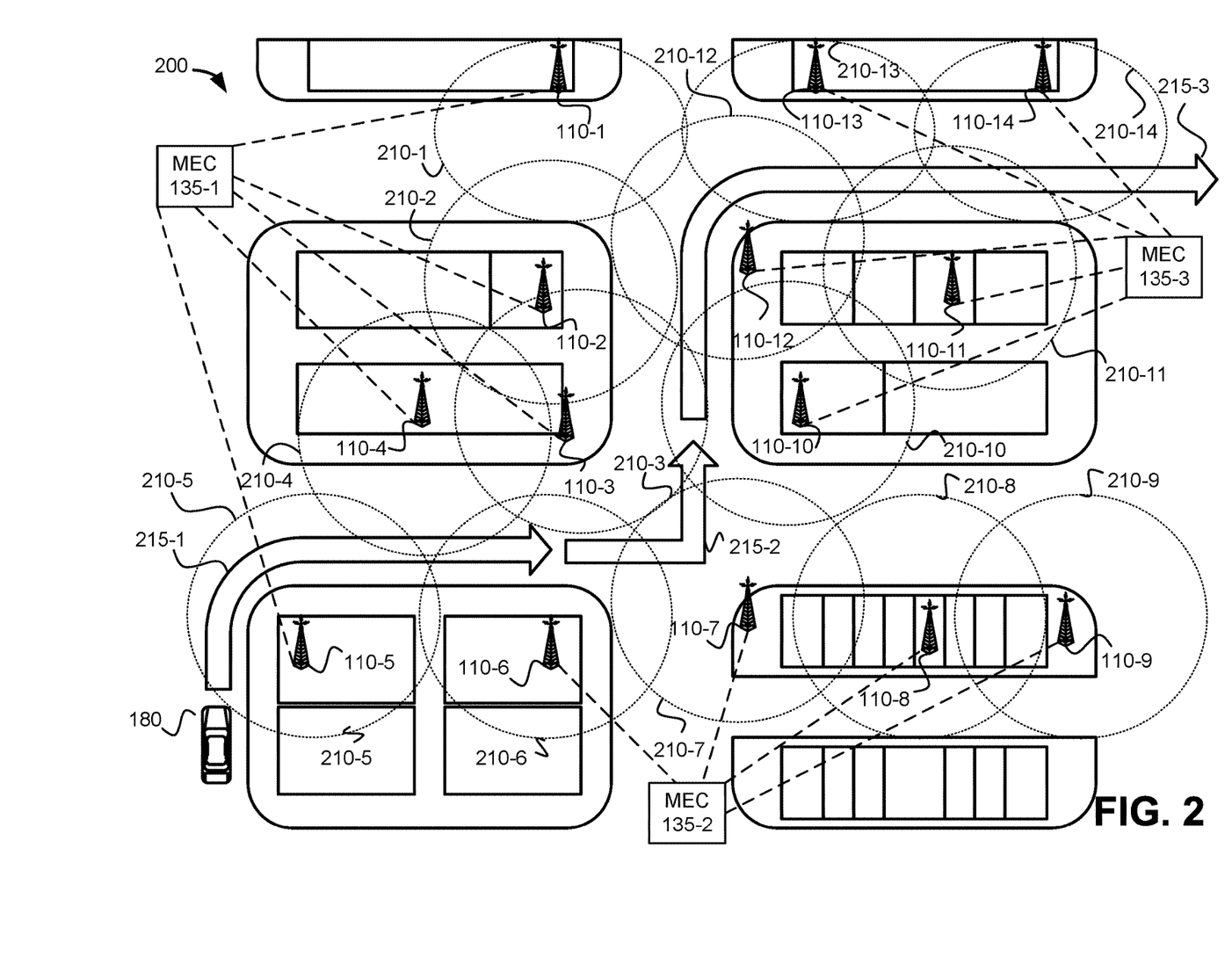
FIG. 2 is a diagram illustrating an exemplary process of an exemplary embodiment of the wireless resources handover service according to an exemplary scenario.

FIG. 2 is a diagram illustrating a network environment 200 that includes exemplary components of environment 100 according to an implementation described herein. As shown in FIG. 2, network environment 200 may include groups of wireless resources, such as wireless stations 110-1 through 110-5, etc., associated with a MEC site (e.g., MEC sites 135-1, 135-2, 135-3, etc.). An end device 180 may move about network environment 200, wirelessly connecting to different wireless stations 110 via an associated coverage area (or cell) 210-x using the wireless resources handover service described herein.

In one example, end device 180 may be a modem or other device in an autonomous vehicle. The modem may connect to a wireless network executing an autonomous driving application. The application may provide commands to the modem based on navigation information corresponding to a predetermined route for the vehicle, in which the vehicle may pass through relatively small cells in a relatively short time. In another example, end device may be associated with a drone. Other implementations are possible.

Generally, each MEC site 135 is geographically local to a corresponding group of wireless stations 110. For example, in environment 200, MEC 135-1 may be located in geographic proximity to wireless stations 110-1 through 110-5, while MEC 135-2 may be located in geographic proximity to wireless stations 110-6 through 110-9, etc. MEC sites 135 may be connected to each other in a mesh configuration (or another type of configuration) that enables each MEC site 135 to have knowledge of and/or connectivity to its nearest neighboring MEC site(s) 135.

When end device 180 activates the wireless resources handover service for an application, end device 180 may provide, to the nearest (or default) MEC site (e.g., MEC site 135-1), navigation information. The navigation information may correspond to, for example, driving directions, a rideshare event, a delivery route, a mass transit and/or micro transit route/schedule, a machine-learned commuting pattern, etc. The navigation information may be static or may be dynamically updated in a mobility profile for end device 180. For example, in an embodiment, the wireless resources handover service may determine that end device 180 is traversing a predetermined route and/or route segment. The wireless resources handover service may then determine that deviating from the route and/or from a route segment of a given distance is impracticable, thereby enabling generation of a mobility profile for end device 180 without the provisioning of specific directions.

In another embodiment, the wireless resources handover service, through machine learning or artificial intelligence techniques, may determine end device 180 user's habits and identify an oft-traveled route, for example, during commuting hours. Accordingly, the wireless resources handover service may determine end device 180's predetermined route of travel in the absence of expressly-provided navigation information. A unique identifier may be assigned (e.g., by scheduler 140 of the wireless resources handover service) to an instance or a session of an application. The predetermined navigation information may be correlated to wireless stations 110 and/or MECs 135 along the route.

FIG. 2 is diagram illustrating an exemplary process of an exemplary embodiment of the wireless resources handover service according to an exemplary scenario. As shown in FIG. 2, a route 215, including route segments 215-1, 215-2, and 215-3, may be calculated for end device 180 to enter one or more cells 210 of wireless stations 110 associated with MEC 135-1, one or more cells 210 of wireless stations 110 associated with MEC 135-2, and/or one or more cells 210 of wireless stations 110 associated with MEC 135-3. FIG. 2 includes a portion 200 of network environment 100, including wireless resources such as MECs 135-1 through 135-3 with corresponding wireless stations 110-1 through 110-14.

Assume, after establishing a connection with a wireless station, that end device 180 connects to a first (e.g., default) MEC site 135-1 and the wireless resources handover service is triggered. In response, MEC site 135-1 may request that end device 180 provide navigation information to MEC 130-1. The navigation information may include, for example, a starting location, a destination, and/or a time of departure for end device 180, which may be used, e.g., by scheduler 140 to generate a mobility profile from corresponding driving directions, correlate to a mass transit and/or micro transit route schedule, a machine-learned commuting pattern, etc. MEC site 135-1 may also request and/or otherwise obtain wireless signal quality requirements and/or capabilities associated with end device 180 and/or an application instance associated with a service request. For example, a service type and/or quality of service (QoS) requirements for the service request may be mapped to wireless capabilities associated with and/or available via wireless resources such as wireless stations 110, cells 210, and/or MECs 135.

Scheduler 140 (e.g., executing on MEC site 135-1) may calculate predetermined route 215 for end device 180 based on the mobility profile, the physical location of wireless resources such as wireless stations 110, cells 210, and/or MECs 135. In one implementation, predetermined route 215 may correspond to a map application (e.g., route recommendation) based on a starting location of end device 180. In one implementation, predetermined route 215 may be selected from multiple prospective routes end device 180 may take to the identified destination. Scheduler 140 may select a route based on the number of handovers (i.e., station-to-station and/or intra-MEC) involved, such that the number of handovers is minimized while maintaining service continuity along predetermined route 215. According to one implementation, an estimated time of arrival (ETA) can also be determined for predetermined route 215.

Referring to FIG. 2, scheduler 140 may select some (and not other) wireless resources such as wireless stations 110, cells 210, and/or MEC sites 135 along predetermined route 215 as handover targets. For example, scheduler 140 may determine that route segment 215-1 begins with end device 180 connecting to wireless station 110-5 upon entering cell 210-5, and select wireless station 110-6 as a target for handover upon entering cell 210-6 (involving an inter-MEC handover between MEC site 135-1 and MEC site 135-2), and does not select wireless station 110-4 as a target for handover, and thereby schedule one handover instead of two for route segment 215-1.

Scheduler 140 may further schedule, for route segment 215-2, handover to wireless station 110-7 upon end device 180 entering cell 210-7. Scheduler 140 may select wireless station 110-10 as a target for handover upon entering cell 210-10, and does not select wireless station 110-3 as a target for handover (thereby avoiding a subsequent intra-MEC handover involving MEC site 135-1).

For route segment 215-3, scheduler 140 may then select wireless station 110-12 as a handover target (from wireless station 110-10) upon entering cell 210-12. Scheduler 140 may select wireless station 110-11 as a handover target (from wireless station 110-12) upon entering cell 210-12, and not wireless station 110-13, based on some signal quality and/or load balancing criteria. Route segment 215-3 may further include selection of wireless station 110-14 as a handover target (from wireless station 110-11) upon end device 180 entering cell 210-14.

In one embodiment, scheduler 140 may generate a mobility control message identifying the selected handover target cells 210/wireless stations 110 (e.g., series) and the associated MEC sites 135, an identifier for end device 180, connectivity information (e.g., estimated time of connection), and/or context information (e.g., security, authentication, application instance, etc.). The mobile control message may include, for example, a list of the resources (e.g., computing resources, such as CPU, GPU, and memory; bandwidth; etc.) required for the application being executed on end device 180, an indication of whether the application is stateless or stateful, and/or a priority of the application. Scheduler 140 may send the mobility control message to the candidate MEC site 135 (e.g., MEC site 135-1) to be used at the beginning of predetermined route 215. MEC site 135-1 may send the mobility control message to its neighboring MEC site(s) 135 that are in predetermined route 215 (e.g., MEC site 135-2, MEC site 135-3, etc.). Additionally or alternatively, MEC site 135 may send the mobility control message to the first wireless station (e.g., 110-5) in predetermined route 215, and/or one or more other wireless stations 110. Wireless station 110-5 may forward the mobility control message to the next wireless station (e.g., 110-6) and so on. Upon receiving the mobility control message, MEC sites 135 and/or wireless stations 110 may reserve the predetermined amount of resources for the time when end device 180 is scheduled to be within associated cells 210.

Movement of end device 180 along predetermined route 215 may be tracked via GPS and updates including end device 180 positions and/or times associated with wireless stations 110 connections may be used to generate mobility state information, for example, by scheduler 140. In other embodiments, scheduler 140 may track movement through signaling with MEC sites 135 and/or wireless stations 110 and end device 180. Mobility state information for end device 180 may be used by MEC sites 135 and/or wireless stations 110 to begin servicing the application for end device 180 and/or to adjust scheduled arrival/connection times.

In one embodiment, deviations from predetermined route 215 may be detected by scheduler 140 and may trigger recalculation of predetermined route 215 and generation of corresponding mobility state information. Scheduler 140 may send recalculated predetermined route 215 to affected MEC sites 135 and/or wireless stations 110, and the wireless resources handover service may be provided accordingly.

Although FIG. 2 illustrates an exemplary process of the wireless resources handover service, according to other exemplary embodiments, the process may include additional, different, and/or fewer steps. For example, exchange of state information may not be required in some instances. Additionally, or alternatively, additional communications between MEC sites 135 and/or wireless stations 110 may be exchanged to update predictions and/or assign resources.

Figure 3:
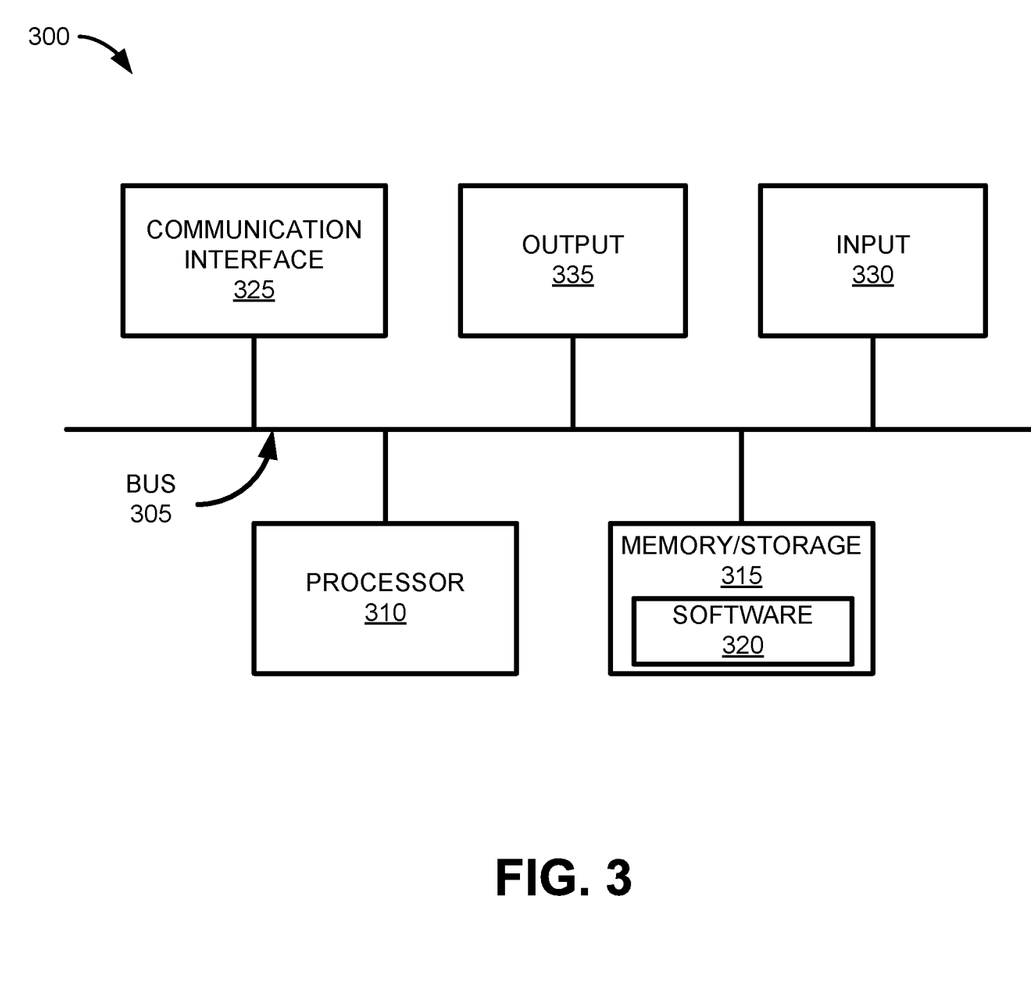
FIG. 3 is a diagram illustrating exemplary components of a device that may correspond to one or more of the devices illustrated and described herein.

FIG. 3 is a diagram illustrating example components of a device 300 according to an implementation described herein. Wireless station 110, MEC site 135, scheduler 140, network devices 155/165, and/or end device 180 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 405 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, MEC site 135 and/or scheduler 140 may include logic to perform tasks, as described herein, based on software 320. Furthermore, end devices 110 may store applications that require services/resources from MEC sites 135.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a communication standard and/or protocols. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
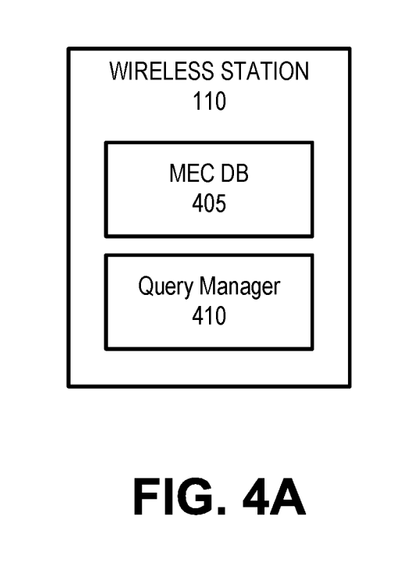
FIG. 4A is a functional block diagram of components implemented for the wireless station of FIG. 1.

FIG. 4A is an exemplary functional block diagram of components implemented in wireless station 110. In one implementation, all or some of the components illustrated in FIG. 4A may be implemented by a processor 310 executing software instructions 320 stored in memory/storage 315. As shown in FIG. 4A, wireless station 110 may include a MEC database (DB) 405 and a query manager 410.

In one implementation, MEC DB 405 may store an application instance identifier associated with a corresponding MEC site 135. For example, wireless station 110 may receive and store an application instance identifier and a MEC site identifier (e.g., an IP address) from scheduler 140. When an inter-MEC handover of end device 180 occurs, wireless station 110 may use MEC DB 405 to direct end device 180 to the designated MEC site 135. MEC DB 405 may store a mobility control message received, for example, from scheduler 140.

In another implementation, MEC DB 405 may store characteristics of MEC sites 135 in MEC network 130. For example, MEC DB 405 may store static latency values between a wireless station 110 and each MEC 135. Static latency values may reflect, for example, a projected and/or measured latency period between a specific wireless station 110 and a specific MEC site 135 (e.g., via a backhaul link 120). MEC DB 405 may also collect and store variable latency values between end devices 180 and wireless stations 110. The variable latency values and the static latency values may be used to project a total application latency for an end device 180 to a MEC site 135. MEC DB 405 may store computer resources (e.g., CPU/GPU), available memory, and available bandwidth associated with a MEC site 135. In one implementation, MEC DB 405 may store authentication data for end device 180, for example, based on a mobility control message received from scheduler 140. MEC DB 405 may be updated over time and may store other types of information pertaining to MEC sites 135 (e.g., applications hosted, etc.).

Query manager 410 may receive a service request from end device 180 (e.g., for a specific application). In one implementation, query manager 410 may use MEC DB 405 to match an application instance identifier with a designated MEC site 135. In another implementation, query manager 410 may identify, among other information, a service type and quality of service (QoS) requirements for the service request and identify a MEC site 135 that is capable of meeting the service type and QoS requirements. In one implementation, query manager 410 may use MEC DB 405 to perform a lookup of available MEC sites 135 that meet requirements of the service request from end device 180.

Figure 4B:
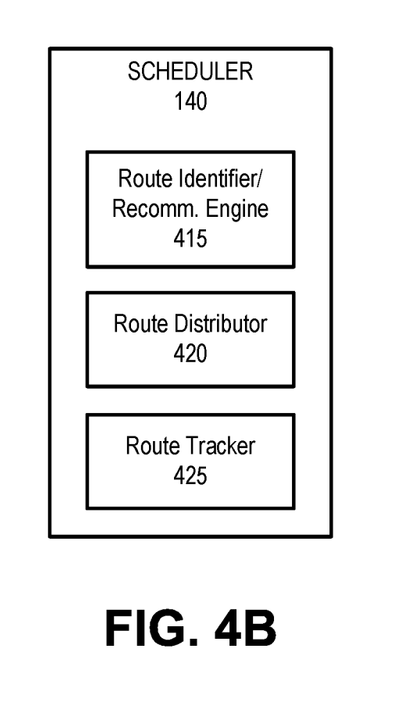
FIG. 4B is a functional block diagram of components implemented for the scheduler of FIG. 1.

FIG. 4B is an exemplary functional block diagram of components implemented in scheduler 140. In one implementation, all or some of the components illustrated in FIG. 4B may be implemented in a distributed network of MEC sites 135, each with a processor 310 executing software instructions 320 stored in memory/storage 315. In another implementation, scheduler 140 may include a centralized component executing software instructions 320 stored in memory/storage 315. As shown in FIG. 4B, scheduler 140 may include a route identifier/recommendation engine 415, a route distributor 420, and a route tracker 425.

Route identifier/recommendation engine 415 may receive a predetermined route of travel from end device 180 as part of an initial request for service. In one implementation, route identifier/recommendation engine 415 may assign, for tracking purposes, a unique identifier to the instance of the application being serviced. Route identifier/recommendation engine 415 may map or translate the predetermined route into cells 210 associated with wireless stations 110 that will provide the requested service over the predetermined route. Route identifier/recommendation engine 415 may correlate the sequence of wireless stations 110 into a corresponding sequence of MEC sites 135 (referred to herein as a predetermined mobility control route) to service end device 180 while on the predetermined route. In one implementation, the sequence of wireless stations 110 and/or MEC sites 135 may be a full beginning to end sequence needed along the predetermined route of end device 180. In another implementation, the sequence of wireless stations 110 and/or MEC sites 135 may include a route segment.

Route distributer 420 may provide the predetermined mobility control route to wireless stations 110 and/or MEC sites 135 of the predetermined MEC route, via a mobility control message. When scheduler 140 is a distributed system, route distributor 420 may send the mobility control message to neighboring wireless stations 110 and/or MEC sites 135 that are in the predetermined mobility control route, for forwarding to their neighboring wireless stations 110 and/or MEC sites 135. Route distributer 420 may include with the mobility control message, information indicating the resources required for end device 180, whether the corresponding application is stateless or stateful, and a priority of the application, etc.

Route tracker 425 may obtain feedback to track end device 180 while on the predetermined route. In one implementation, route tracker 425 may receive position feedback for end device 180 based on wireless station 110 connectivity. In another implementation, route tracker 425 may receive feedback from end device 180 based on GPS data or another location determining system. As end device 110 moves, route tracker 425 may monitor the actual path and provide confirmation or deviation updates on the predetermined route to route identifier/recommendation engine 415. In one implementation, updates to the predetermined mobility control route may be sent to wireless stations 110 and/or MEC sites 135 that are in the updated route.

Figure 4C:
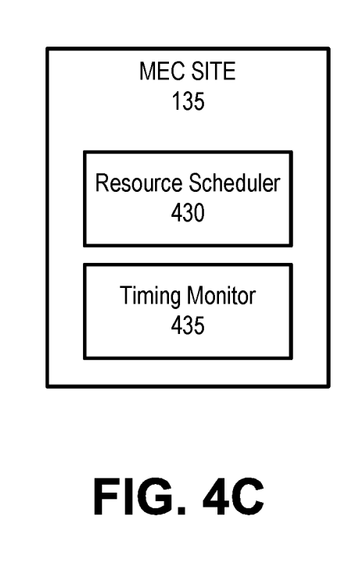
FIG. 4C is a functional block diagram of components implemented for the MEC site of FIG. 1.

FIG. 4C is an exemplary functional block diagram of components implemented in MEC site 135. In one implementation, all or some of the components illustrated in FIG. 4C may be implemented by processor 310 executing software instructions 320 stored in memory/storage 315. As shown in FIG. 4C, MEC site 135 may include a resource scheduler 430 and a timing monitor 435.

Resource scheduler 430 may reserve resources for use by end device 180. For example, based on the predetermined mobility control route, resource scheduler 430 may reserve specific resources (e.g., CPU/GPU, bandwidth, etc.) for a predetermined time window. If MEC site 135 has sufficient resources at the anticipated time, resource scheduler 430 may prepare for arrival of end device 180. If MEC site 135 has a constraint on resources, resource scheduler 430 may evaluate the latency requirements for end device 180 and decide if other nearby MEC sites 135 can substitute. If a substitute is available, MEC site 135 may redirect the session for the application to another MEC site 135. Resource scheduler 430 may notify scheduler 140 about the substitute MEC.

Timing monitor 435 may monitor schedules for MEC site 135. For example, a timer in each MEC site 135 may be implemented for timeouts in case a schedule does not hold. Thus, if an update for a predetermined mobility control route is not provided to MEC site 135 within a certain time-out interval, timing monitor 435 may signal resource scheduler 430 to release reserved resources for a particular application/end device 180.

Although FIGS. 4A-4C show exemplary logical components of different devices in network environment 100, in other implementations, these devices may include fewer logical components, different logical components, additional logical components or differently-arranged logical components than depicted in FIGS. 4A-4C. For example, in one implementation, one or more logical components of scheduler 140 may be performed by MEC sites 135.

Figure 5:
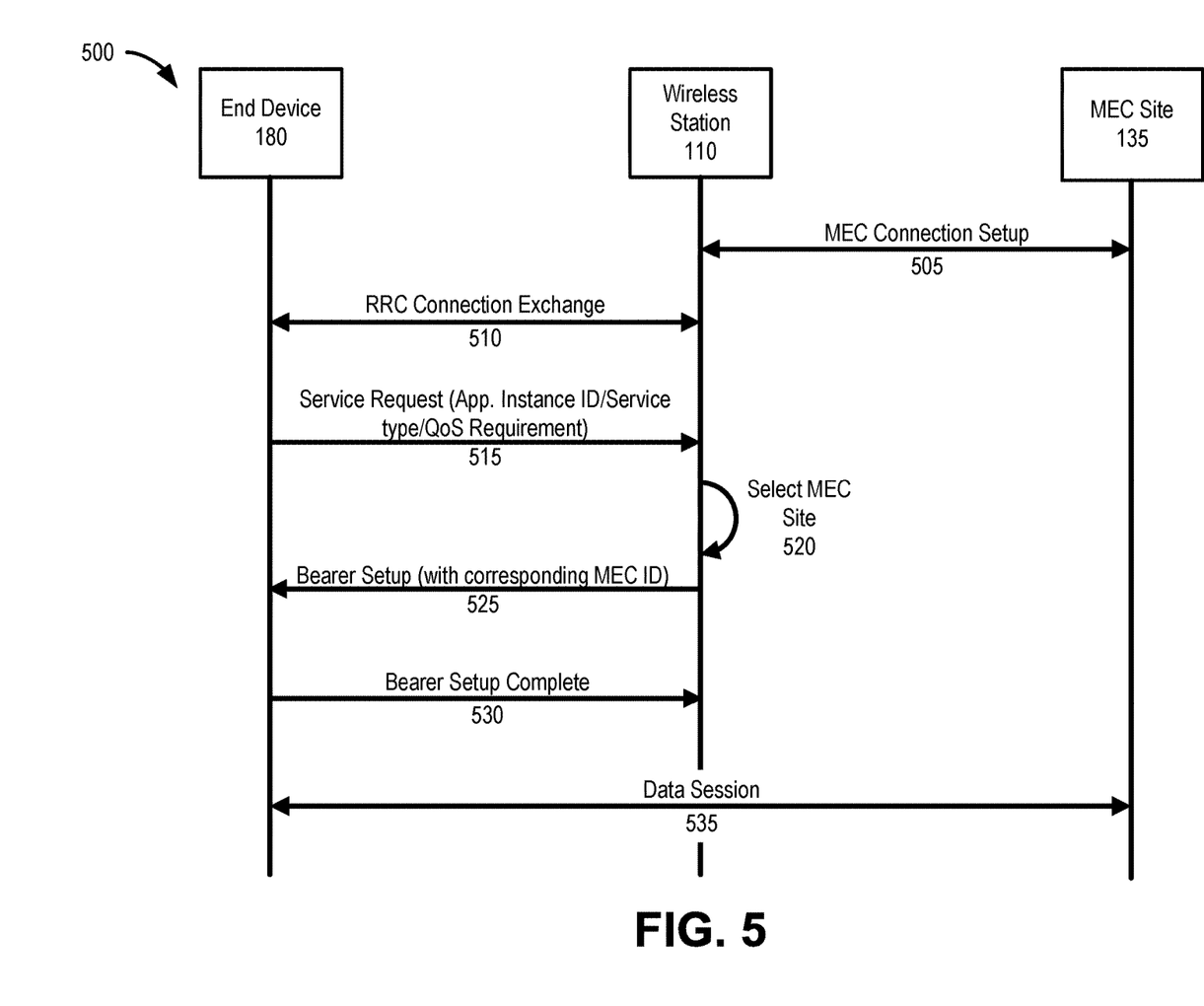
FIG. 5 is a signal flow diagram illustrating exemplary communications among devices for a portion of the network environment of FIG. 1.

FIG. 5 is a diagram illustrating exemplary communications for a wireless resources handover service in a portion 500 of network environment 100. Communications illustrated in FIG. 5 (or portions thereof) may be repeated for each wireless station handover of end device 180 through a predetermined route (e.g., route 215). Network portion 500 may include wireless station 110, MEC site 135, and end device 180. Communications shown in FIG. 5 provide simplified illustrations of communications in network portion 500 and are not intended to reflect every signal or communication exchanged between devices.

As shown in FIG. 5, wireless station 110 may perform a MEC connection setup 505 with MEC site 135. For example, based on a predetermined mobility control route, MEC site 135 may associate with specific wireless stations 110 along predetermined route 215. In one implementation of connection setup 505, MEC site 135 may detect the unique application instance identifier that should be directed to MEC site 135. In another implementation of connection setup 505, MEC site 135 may provide (or wireless station 110 may determine) fixed latency values between wireless station 110 and MEC site 135. MEC site 135 may also indicate an IP address or another identifier for MEC site 135 and resources (e.g., memory, CPU capacity, bandwidth, etc.) available to end devices 180. In one implementation, MEC connection setup 505 may be updated periodically or as changes occur.

Assume, during a handover of end device 180, that end device 180 and wireless station 110 perform a radio resource control (RRC) connection exchange 510. For example, end device 180 may generate an RRC Connection Request message via a control channel and, in response, wireless station 110 may respond with an RRC Connection Setup message. Wireless station 110 may transmit the RRC Connection Setup message to end device 180 via the control channel.

As part of or subsequent to RRC connection exchange 510, end device 180 may generate and transmit a service request message 515. Service request message 515 may include service requirements for an application executed on end device 180, as well as navigation information such as a starting location and a destination. In one embodiment, the navigation information may include substantially turn-by-turn directions. The service requirements may include, for example, the unique application instance identifier, a service type, maximum latency, jitter, state requirements, QoS requirements, etc., for the application.

Wireless station 110 may receive service request message 515 (including the unique application instance identifier, navigation information, and/or application service requirements) from end device 180 and select MEC site 135, as indicated by reference number 520. For example, wireless station 110 may reference MEC DB 405 to match the unique application instance identifier and/or the navigation information to a particular MEC site 135. Additionally, or alternatively, wireless station 110 may reference MEC DB 405 to identify application service requirements with stored MEC site characteristics.

After selecting MEC site 135, wireless station 110 may send to end device 180 a bearer setup message 525 with a corresponding bearer MEC identifier (e.g., an IP address or another unique identifier). End device 180 may receive the bearer setup information and provide a bearer setup complete message 530 to wireless station 110 and use the MEC identifier to establish a data session 535 with MEC 135. Using data session 535, MEC site 135 can provide service to the application on end device 180.

Figure 6:
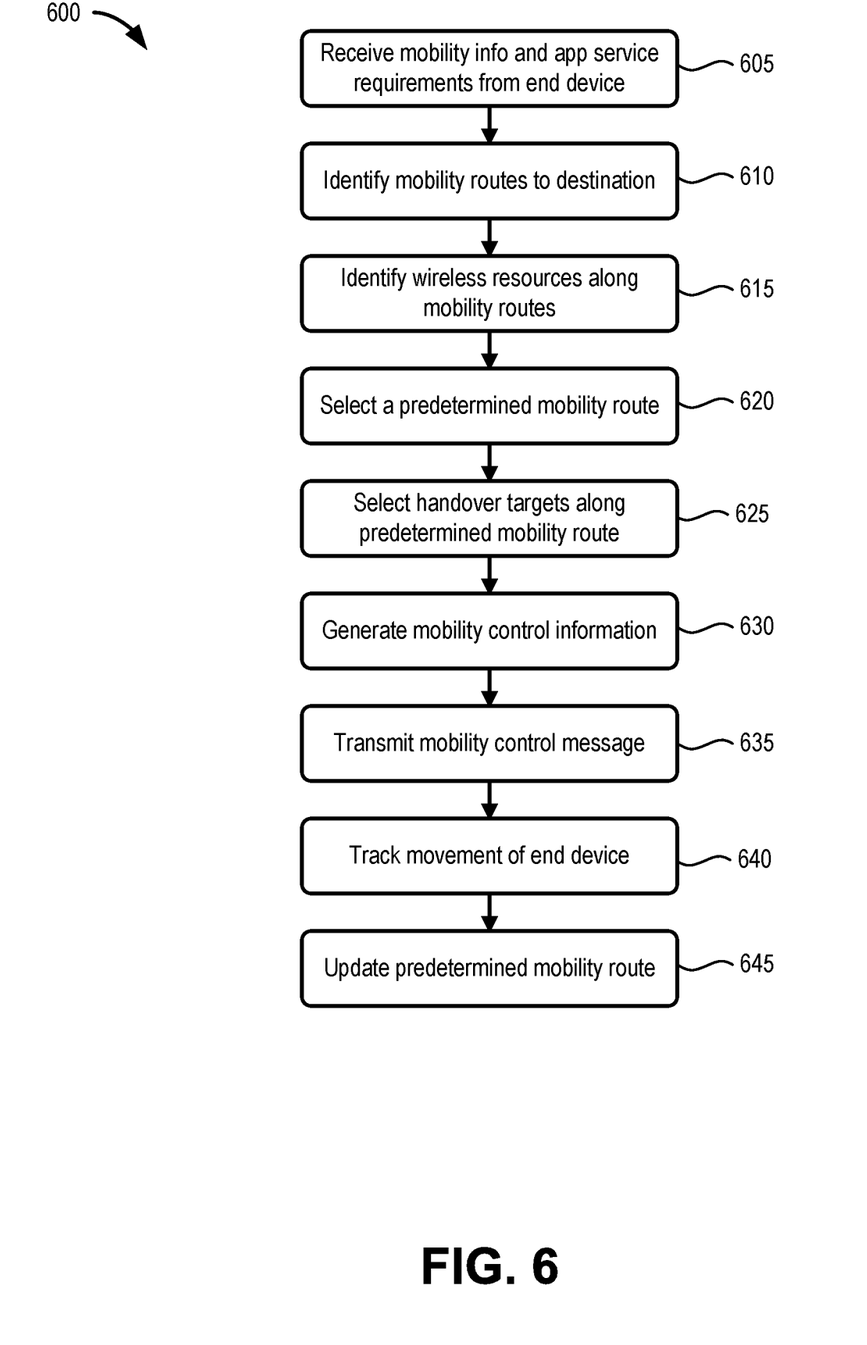
FIG. 6 is a flow diagram illustrating an exemplary process for implementing a wireless resources handover service, according to implementations described herein.

FIG. 6 is a flow diagram illustrating an exemplary process 600 for providing a wireless resources handover service, according to an implementation described herein. In one implementation, process 600 may be implemented by scheduler 140. In another implementation, process 600 may be implemented by MEC site 135 in conjunction with one or more other devices in network environment 100.

Referring to FIG. 6, process 600 may include receiving mobility information and application service requirements from an end device (block 605). For example, upon initial attachment to a wireless network resource (e.g., MEC site 135-1), end device 180 may provide navigation information (e.g., starting location, destination location, departure time, mode of travel, etc.) along with service requirements for an application being executed on end device 180. According to an implementation, a predetermined route of travel may be determined from, for example, driving directions from another application or synched device (e.g., a map program, a GPS application, a vehicle navigation system, etc.), a mass transit and/or micro transit route schedule, an identified commuting pattern, etc.

Process 600 may also include determining multiple routes from the starting location to the destination location (block 610). For example, scheduler 140 may map out prospective mobility routes based on distance, travel time, traffic, etc., as well as the application, application service requirements, and the wireless stations and MEC sites along the prospective mobility routes.

Process 600 may also include identifying respective sets of wireless resources, such as wireless stations 110 and associated cells 210 and MEC sites 135 for each of the prospective mobility routes (block 615). For example, MEC site 135-1 (e.g., serving as scheduler 140/route identifier/recommendation engine 415) may map the mobility routes to cells that can provide service over the mobility route. MEC site 135-1 may then correlate a sequence of wireless stations 110 to a mobility route for servicing end device 180 while on the mobility route.

Process 600 may further include selecting, from the multiple prospective mobility routes, a predetermined mobility route based on the identified sets of wireless resources, such as wireless stations 110, cells 210, and MEC sites 135 (block 620). For example, MEC site 135-1 may select the predetermined mobility route based on signal quality and/or wireless service continuity associated with the wireless infrastructure along the prospective mobility routes.

Process 600 may further include selecting some—and not others—of the wireless resources, such as wireless stations 110, as handover targets along the predetermined mobility route (block 625). For example, in one implementation, MEC site 135-1 may select wireless stations 110 for inclusion in a series of handovers such that the total number of station-to-station handovers along the route (or a route segment) are minimized. Additionally or alternatively, wireless stations 110 may be selected for inclusion in a series of handovers such that the total number of inter-MEC site handovers along the route (or a route segment) are minimized. In other embodiments, the specific wireless stations 110 may be selected to maximize service continuity for mobility characteristics of end device 180.

Process 600 may further include generating mobility control information including a list of wireless resources handover targets and security context, for example, associated with wireless stations 110 and/or MEC sites 135 (block 630). For example, MEC site 135-1 may list identifiers of wireless stations 110 and times that correspond to an estimated time of arrival of end device 180 in cells 210 associated with the handover targets. In one embodiment, the security context may include at a type of traffic, a type of application pertaining to the traffic, a type of end device 180, and/or a type of access mode used by end device 180 for establishment of a radio connection. Security context may include encrypted data or data that is not encrypted.

Process 600 may also include scheduler using the mobility control information to generate a mobility control message and transmitting the mobility control message to one or more of the wireless resources, such as MEC 135-1 and/or wireless stations 110 (at least the first wireless station 110 in the predetermined route) prior to end device 180 moving along the predetermined mobility route and/or predetermined mobility route segments (block 635). Station-to-station and/or inter-MEC site handovers may be pre-arranged using the mobility control messages. In one embodiment, MEC 135-1 may register for application function (AF) influence (i.e., session mobility) based on the mobility control message.

In some embodiments, process 600 may include tracking movement of end device 180 (block 640) as described above. For example, when MEC site 135-1 detects deviation of end device 180 from the predetermined mobility route (in space and/or time), process 600 may further include generating updates to the predetermined mobility route and publishing the update to the affected wireless resources, such as wireless stations 110 and/or MEC sites 135 (block 645).

Systems and methods described herein provide a wireless resources handover service. For example, network device in a MEC network receives a predetermined mobility route for an end device executing an application instance. The predetermined mobility route identifies a projected time when the end device will connect to the network device for services and a service requirement for the application instance, and a timeframe for performing handover. The network device reserves resources to service the application instance at the projected time, based on the predetermined mobility route. The network device provides a computing service for the application instance using the reserved resources when the end device initiates a data session with the network device.

In one example use case, MEC site 135-1 may generate an application function (AF) influence request for end device 180 to a scheduler 140. In response to the request, scheduler 140 may register end device 180 for session mobility. For example, route identifier/recommendation engine 415 may obtain a destination for end device 180 and/or service requirements associated with an executing application or a service level associated with a user (e.g., subscriber) of end device 180, and generate different routes to the destination. Route identifier/recommendation engine 415 may filter routes based on available data throughput for various cells 210, travel distance, travel time, traffic, tolls, etc. In one embodiment, service continuity may be one factor among other others to be considered in route selection and/or recommendation. In another embodiment, service continuity may be disproportionately weighted to be a primary consideration in route selection and/or recommendation, for example, based on user input. In other embodiments, service continuity may be the only consideration in route selection and/or recommendation. The route recommendation generated by route identifier/recommendation engine 415 may be presented to the user of end device 180. In one embodiment, multiple routes may be presented and the user may be prompted to make a selection. Based on user input, MEC sites 135 along the selected route may be notified and security contexts negotiated ahead of the actual handovers, as described elsewhere herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    obtaining, by a network device, mobility information associated with an end device, wherein the mobility information includes a starting location and a destination location;
    identifying, by the network device, multiple mobility routes from the starting location to the destination location;
    identifying, by the network device, a set of wireless resources along each of the mobility routes;

selecting, by the network device and from the multiple mobility routes, a predetermined mobility route based on the sets of wireless resources;
selecting, by the network device from the sets of wireless resources, wireless resources handover targets in the predetermined mobility route;
generating, by the network device, mobility control information including the wireless resources handover targets; and
transmitting, by the network device, a mobility control message including the mobility control information to the end device and at least one of the wireless resources handover targets.

2. The method of claim 1, wherein the mobility control information includes a timeframe for performing a handover between the end device and each of the wireless resources handover targets.

3. The method of claim 2, further comprising:
obtaining position information associated with the end device along the predetermined mobility route; and
transmitting, based on the position information, updates of the timeframes to one or more of the wireless resources handover targets.

4. The method of claim 1, wherein the wireless resources are associated with cells and a multi-access edge computing (MEC) site.

5. The method of claim 1, wherein the mobility control message includes service requirements corresponding to a type of service requested by the end device.

6. The method of claim 1, wherein the mobility control message includes security context for the wireless resources handover targets.

7. The method of claim 6, wherein the security context includes at least one of a type of traffic, a type of application pertaining to the traffic, a type of the end device, or a type of access mode used by the end device for establishment of a radio connection.

8. A network device comprising:
a communication interface;
a memory, wherein the memory stores instructions; and
a processor, wherein the processor executes the instructions to:
obtain mobility information associated with an end device, wherein the mobility information includes a starting location and a destination location;
identify multiple mobility routes from the starting location to the destination location;
identify a set of wireless resources accessible along each of the mobility routes;
select, from the multiple mobility routes, a predetermined mobility route based on the sets of wireless resources;
select, from the sets of wireless resources, wireless resources handover targets in the predetermined mobility route;
generate mobility control information including the wireless resources handover targets; and
transmit a mobility control message including the mobility control information to the end device and at least one of the wireless resources handover targets.

9. The network device of claim 8, wherein the mobility control information includes a timeframe for performing a handover between the end device and each of the wireless resources handover targets.

10. The network device of claim 9, wherein the processor further executes the instructions to:

obtain position information associated with the end device along the predetermined mobility route; and
transmit, based on the position information, updates of the timeframes to one or more of the wireless resources handover targets.

11. The network device of claim 8, wherein the wireless resources are associated with cells and a multi-access edge computing (MEC) site.

12. The network device of claim 8, wherein the mobility control message identifies includes service requirements corresponding to a type of service requested by the end device.

13. The network device of claim 8, wherein the mobility control message includes security context for the wireless resources handover targets.

14. The network device of claim 13, wherein the security context includes at least one of a type of traffic, a type of application pertaining to the traffic, a type of the end device, or a type of access mode used by the end device for establishment of a radio connection.

15. A non-transitory, computer-readable storage medium storing instructions executable by a processor of a computational device, which when executed cause the computational device to:
obtain mobility information associated with an end device, wherein the mobility information includes a starting location and a destination location;
identify multiple mobility routes from the starting location to the destination location;
identify a set of wireless resources accessible along each of the mobility routes;
select, from the multiple mobility routes, a predetermined mobility route based on the sets of wireless resources;
select, from the sets of wireless resources, wireless resources handover targets in the predetermined mobility route;
generate, mobility control information including the wireless resources handover targets; and
transmit, a mobility control message including the mobility control information to the end device and at least one of the wireless resources handover targets.

16. The non-transitory, computer-readable storage medium of claim 15, wherein the mobility control information includes a timeframe for performing a handover between the end device and each of the wireless resources handover targets.

17. The non-transitory, computer-readable storage medium of claim 16, further storing instructions executable by the processor of the computational device, which when executed cause the computational device to:
obtain position information associated with the end device along the predetermined mobility route; and
transmit, based on the position information, updates of the timeframes to one or more of the wireless resources handover targets.

18. The non-transitory, computer-readable storage medium of claim 17, wherein the wireless resources are associated with cells and a multi-access edge computing (MEC) site.

19. The non-transitory, computer-readable storage medium of claim 16, wherein the mobility control message identifies includes service requirements corresponding to a type of service requested by the end device.

20. The non-transitory, computer-readable storage medium of claim 19, wherein the mobility control message includes at least one of a type of traffic, a type of application pertaining to the traffic, a type of the end device, or a type of access mode used by the end device for establishment of a radio connection.

\* \* \* \* \*